United States Patent [19]

Light et al.

[11] Patent Number: 4,879,355

[45] Date of Patent: Nov. 7, 1989

[54] COMPATIBLE TRICOMPONENT POLYMER BLENDS

[75] Inventors: Ronald R. Light; Robert W. Seymour, both of Kingsport, Tenn.

[73] Assignee: Eastman Kodak, Rochester, N.Y.

[21] Appl. No.: 250,650

[22] Filed: Sep. 29, 1988

[51] Int. Cl.[4] ............................................. C08F 20/00
[52] U.S. Cl. ..................................... 525/439; 525/466
[58] Field of Search ................................ 525/439, 466

[56] References Cited

U.S. PATENT DOCUMENTS

| | | | |
|---|---|---|---|
| 4,018,750 | 4/1977 | Onizawa | 260/78 A |
| 4,123,436 | 10/1978 | Holub et al. | 260/30.8 R |
| 4,237,325 | 12/1980 | Brandes et al. | 568/896 |
| 4,246,381 | 1/1981 | Robeson | 525/444 |
| 4,352,907 | 10/1982 | Lee | 524/537 |
| 4,764,556 | 8/1988 | Lausberg et al. | 525/67 |
| 4,786,692 | 11/1988 | Allen et al. | 525/439 |

*Primary Examiner*—Theodore E. Pertilla
*Attorney, Agent, or Firm*—John F. Stevens; William P. Heath, Jr.

[57] ABSTRACT

A clear polymer blend comprising:
(1) 50–90 wt. % of a glycol copolyester having repeat units from 1,4-cyclohexanedimethanol, terephthalic acid and an alkylene glycol;
(2) 45–5 wt. % of a polycarbonate resin; and
(3) 5–45 wt. % of an aromatic polyester having repeat units from terephthalic acid, isophthalic acid and Bisphenol A.

11 Claims, No Drawings

COMPATIBLE TRICOMPONENT POLYMER BLENDS

FIELD OF INVENTION

The invention relates to novel tricomponent polymer blends of poly(ethylene-co-cyclohexylenedimethylene terephthalate), Bisphenol A polycarbonate and poly(bisphenol A terephthalate-co-isophthalate) polymer resins.

DISCUSSION OF THE BACKGROUND

Polymer blends or polyblends are mixtures of structurally different polymers or copolymers. Commercially important polyblends are generally mechanical polyblends which are made by melt-blending the various polymers in an extruder or other suitable intensive mixer. Polymer blending technology generally rests on the premise of property additivity, wherein the polymer blend has the combined properties which are found in each of the component polymers separately. A polymer blend can therefore have properties which are unavailable to the individual polymer components by themselves.

Blending of polymers is also cost efficient. Expensive polymers may be blended with inexpensive polymers to obtain a useful polyblend which has a cost:performance ratio that makes it very attractive for any given application. The standards of performance for any given application can therefore be met using blends of two known polymers without the need to develop completely new polymers and new plant equipment. There is a continuing need for novel and useful polymer blends.

Engineering plastics such as molding compositions should generally have a good balance of high tensile properties, stiffness, compressive and shear strength as well as impact resistance and should be easily moldable. For specific applications clear polymer blends may be desirable. Their physical properties should be reproducible and predictable and they should retain their physical properties over a wide range of heat and chemical conditions. Engineering plastics should be able to resist mechanical stress for long periods of time.

Blends of copolyester polymers with polycarbonates are known and have excellent melt processability and high impact strength. For example, European Pat. No. 01 11 810 discloses blends of an aromatic polycarbonate with a copolyester derived from 1,4-cyclohexanedimethanol, ethylene glycol and terephthalic and/or isophthalic acid monomer units. Blends of Bisphenol A polycarbonate containing 20-80 wt.% of the copolyester copolymer are hazy and exhibit two glass transition temperatures (Tg) which is indicative of immiscibility between the two polymers.

U.S. Pat. No. 4,237,325 and U.S. Pat. No. 4,246,381 disclose thermoplastic polymer blends containing a polyarylate derived from a dihydric phenol and an aromatic dicarboxylic acid, such as, for example bisphenol A polyesters and a copolyester derived from a cyclohexanedimethanol, an alkylene glycol and an aromatic dicarboxylic acid. These blends are described as having an excellent melt processability, high impact strength and weatherability.

A need continues to exist, however, for new and miscible polymer blends with improved combinations of properties.

SUMMARY OF THE INVENTION

Accordingly, one object of the present invention is to provide a polymer blend which is miscible, has excellent melt processability, high impact strength and weatherability.

Another object of the invention is to provide a polymer blend which is clear in all blended proportions.

These and other objects which will become apparent from the following specifications are achieved by the present polymer blend comprising (1) 25-90 wt.% of a glycol copolyester having repeat units from 1,4-cyclohexanedimethanol, terephthalic acid and an alkylene glycol; (2) 70-5 wt.% of a polycarbonate; and (3) 5-45 wt.% of an aromatic polyester having repeat units from isophthalic acid or its mixtures with terephthalic acid, and Bisphenol A. The percentages are selected so that the total will be 100%.

DETAILED DESCRIPTION OF THE PREFERRED EMBODIMENTS

Surprisingly, it has been discovered that clear miscible blends of a glycol copolyester derived from 1,4-cyclohexanedimethanol, terephthalic acid and an alkylene glycol with a polycarbonate resin can be prepared by adding a compatibilizing aromatic polyester derived from 4,4'-isopropylidenediphenol (Bisphenol A), isophthalic acid or mixtures of isophthalic acid with terephthalic acid. Conventional blends of the glycol copolyesters with polycarbonates are known to form hazy blends which exhibit two separate glass transition temperatures. The compatible tricomponent blends of the present invention, on the other hand, exhibit one glass transition temperature, indicating miscibility and compatibility of the tricomponent mixture. The tricomponent polyester blends of the present invention have good clarity as well as excellent heat resistance and weatherability which makes them ideal for use in the preparation of outdoor molded components such as, for example, in the automotive field.

According to the present invention, therefore, there is provided a clear polymer blend comprising:

(1) 25-90 wt. % of copolyester having repeat units from 1,4-cyclohexanedimethanol, terephthalic acid and an alkylene glycol;

(2) 70-5 wt. % of a polycarbonate resin; and (3) 5-45 wt. % of an aromatic polyester having repeat units from isophthalic acid or terephthalic acid/isophthalic acid mixtures and Bisphenol A.

Polycarbonate resins which are suitable for use in the present invention are well known in the art and are generally commercially available. These polycarbonates may be prepared by a variety of conventional and well known processes which include transesterification, melt polymerization, interfacial polymerization, etc. The polycarbonates are generally prepared by reacting a dihydric phenol with carbonate precursor, such as for example, phosgene. Suitable processes for preparing the polycarbonates of the present invention are described in, for example, U.S. Pat. Nos. 4,018,750, 4,123,436 and 3,153,008. However, other known processes for producing polycarbonates are suitable. Particularly preferred polycarbonates are aromatic polycarbonates, which are prepared, for example, by reacting Bisphenol A with phosgene. A homopolymer of Bisphenol A with phosgene is sold by General Electric and Mobay Chemicals under the trade names LEXAN and MERLON, respectively. Preferred polycarbonates have an inherent viscosity between about 0.35–0.55 dl/gram.

The glycol polyester of the present invention is prepared by polymerizing terephthalic acid; 1,4-cyclohexanedimethanol and alkylene glycol monomers. The glycol component is a combination of cyclohexanedimethanol and an alkylene glycol or mixture of alkylene glycols. Alkylene glycols having from 2-6 carbon atoms are preferred, with ethylene glycol being particularly preferred.

The glycol component generally comprises from about 50 to 80% of the alkylene glycol, the remainder being cyclohexanedimethanol. Preferably, the alkylene glycol comprises from 65-75% of the glycol component. Specific examples of the glycol polyesters include the copolyester containing repeat units from about 30 mol % 1,4-cyclohexanedimethanol and about 70 mol % ethylene glycol, and about 100 mol % terephthalic acids, sometimes referred to herein as "Polyester A." Polyester A has excellent clarity and a glass transition temperature of about 83° C. Preferred glycol polyesters have an inherent viscosity in the range from about 0.4 to about 1.0 dl/gram, with a preferred inherent viscosity range of from about 0.5 to about 0.95 dl/gram.

The aromatic polyesters which are used in the present invention are derived from Bisphenol A, isophthalic acid or a mixture of terephthalic and isophthalic acid. A commercial aromatic polyester products is sold by Amoco Performance Products under the trade name ARDEL D100, i.e., poly(bisphenol A (50) terephthalate-co-(50) isophthalate). The acid portion of the aromatic polyester may contain from 0–80 mole % terephthalic acid and from 100–20 mole % isophthalic acid. These aromatic polyesters are prepared by conventional esterification processes such as the acidolysis of Bisphenol A diacetate with terephthalic and isophthalic acids. Preferably, the acid portion of the aromatic polyester comprises 0–75 mole % terephthalic acid and, correspondingly, 25–100 mole % isophthalic acid. The inherent viscosity of the aromatic polyester can vary from about 0.4 dl/gram to about 1.0 dl/gram, but preferably should be in the range from 0.5–0.75 dl/gram.

The three components of the tricomponent blend can be blended together by conventional melt techniques. A particularly convenient method is by mixing powders or pellets of the respective polymers in a melt extruder and extruding the blended copolymer rod, which can then be cut into managable pellets. Alternatively, the three components of the tricomponent blend may be mixed and stirred in molten form in a batch reactor.

The preferred amount of the glycol copolyester present in the tricomponent blend should be about 50–90 wt.% with blends containing approximately 50 wt.% of the glycol copolyester being particularly preferred. The polycarbonate resin should be present in amounts from 70–5 wt.%, and the aromatic polyester should be present in amounts from 5–45 wt.%. It is particularly preferred if both the polycarbonate resin and the aromatic polyester, in combination, are used in concentrations between 10–40 wt. % with the balance being the glycol copolyester.

The tricomponent blend of the present invention is an excellent molding composition and can be formed into shaped objects such as films, fibers and molded objects. Additionally, the tricomponent blend may serve as a protective laminated or coextruded layer, especially where good weather resistance is required for outdoor exposure.

The tricomponent compositions of the present invention may contain additional additives such as synthetic fibers, pigments, glass or metal fibers or flakes, antioxidants, plasticizers, lubricants and other suitable additives in amounts such that the weatherability, clarity, heat resistance, tensile strength and flexural properties of the tricomponent blend are not degraded.

Other features of the invention will become apparent in the course of the following descriptions of exemplary embodiments which are given for illustration of the invention and are not intended to be limiting thereof.

EXAMPLES

Example 1

Five hundred thirty-six grams of pellets of Polyester A are blended with two hundred sixty-four grams of MERLON M40 polycarbonate and dired in a dehumidifying dryer at 60° C. for about 48 hours and melt mixed on a small Brabender extruder at about 260° C. and chopped into pellets. The sample is redried at about 60° C. in the same equipment described above. After drying, the sample is molded into tensile bars on a small molding machine. The bars are hazy and Differential Scanning Calorimetry (DSC) analysis shows the sample to have two Tg's, one at 83° C. and the other at 145° C.

Example 2

Four hundred grams of pellets of Polyester A are blended with two hundred eighty grams of ARDEL D100 aromatic polyester and one hundred twenty grams of MERLON M40 polycarbonate. The sample is dried at 60° C. in a dehumidifying dryer and extrusion compounded on a small Brabender extruder at about 300° C. and chopped into pellets. The extrusion compounded sample is redried as in Example 1 and molded on a small molding machine into tensile bars. Surprisingly, the tensile bars are clear and have one Tg at about 110° C. between that of Polyester A and the polycarbonate. Another surprising aspect of this blend is its weatherability. On aging in a Sunshine Carbon-Arc XWR Weather-Ometer, the blend is observed to retain its flatwise impact strength after 2000 hours exposure and remains clear during this test interval. The mechanical properties of the tricomponent blend compare to a Polyester A control sample are presented in Table 1. These data demonstrate that, surprisingly, the tricomponent blend has higher tensile strength, low temperature toughness, and heat deflection temperatures at 66 psi and 264 psi than pure Polyester A.

Example 3

Four hundred grams of pellets of Polyester A are blended with two hundred forty grams of pellets of ARDEL D100 aromatic polyester and one hundred sixty grams of pellets of MERLON M40 polycarbonate. The sample is dried, compounded, and molded as described in Example 2. Again it is surprising to discover that the blend is clear and has one Tg at about 115° C. which is between Polyester A and MERLON M40. Surprisingly, this blend exhibits good flatwise impact strength after 4000 hours exposure in the Sunshine Carbon-Arc XWR Weather-Ometer. It is observed that this blend has higher tensile strength, low temperature toughness, and heat deflection temperature at 66 psi and 264 psi than pure Polyester A.

Example 4

Four hundred grams of pellets of Polyester A are mixed with two hundred grams of pellets of ARDEL D100 aromatic polyester and two hundred grams of pellets of MERLON M40 polycarbonate. The sample is dried, compounded, and molded in a manner analogous to Example 2. Again, the blend is clear and has one Tg at about 120° C. which is between that of Polyester A and MERLON M40. In addition, when the mechanical properties of the blend are compared to pure Polyester A, it is observed that the blend has higher tensile strength, low temperature toughness, and heat deflection temperature. Also, it was unexpected to find that the blend has excellent weather resistance when it was subjected to the conditions of a Sunshine Carbon-Arc Weather-Ometer.

Example 5

One hundred ninety eight grams of pellets of Polyester A are blended with three hundred seventy eight grams of pellets of MERLON M40 polycarbonate and thirty grams of pellets of ARDEL D100 polyester. The sample is dried, compounded, and molded as described in Example 2. Again, it was surprising to discover that a small amount of ARDEL D100 polyeser provided a blend that is clear and has one Tg at about 130° C. which is between that of Polyester A and MERLON M40 polycarbonate.

Example 6

One hundred sixty eight grams of pellets of Polyester A are blended with three hundred forty two grams of pellets of MERLON M40 polycarbonate and ninety grams of pellets of ARDEL D100 polyester. This sample is dried, compounded and molded similar to that described in Example 2. Again, it is surprising to discover that the blend is clear and has one Tg at about 141° C. which is between that of Polyester A and MERLON M40 polycarbonate.

Example 7 (Control)

One hundred ninety eight grams of pellets of Polyester A are blended with four hundred two grams of pellets of MERLON M40 polycarbonate. The pellet/pellet blend is dried, compounded and molded in the same manner as described in Example 2. In this example, the blend is discovered to have two separate TG's at about 116° C. and 138° C. which gives further support to the desirability to add ARDEL D100 polyester to provide a clear blend with one Tg.

TABLE 1

Properties of Polyester A/Aromatic Polyester/Polycarbonate Blends

|  | Polyester A (Control) | Blend From Ex. 1 | Blend From Ex. 2 | Blend From Ex. 3 |
| --- | --- | --- | --- | --- |
| Density (g/cc) | 1.272 | 1.241 | 1.240 | 1.241 |
| Tensile Strength at Yield (psi) | 5,600 | 8,500 | 8,700 | 9,100 |
| Tensile Strength at Break (psi) | 4,700 | 8,900 | 8,400 | 10,100 |
| Elongation at Break (%) | 26 | 97 | 77 | 86 |
| Flexural Modulus (psi) | 328,000 | 340,000 | 330,000 | 330,000 |
| Flexural Strength (psi) | 11,500 | 14,500 | 14,600 | 14,700 |
| Izod Impact, notched |  |  |  |  |
| (23° C., ft-lb/in) | 1.5 (C) | 1.4 (C) | 1.4 (C) | 1.4 (C) |
| (−24° C., ft-lb/in) | 0.7 (C) | 1.3 (C) | 1.2 (C) | 1.4 (C) |
| (−40° C., ft-lb/in) | 0.5 (C) | 1.3 (C) | 1.2 (C) | 1.4 (C) |
| unnotched |  |  |  |  |
| (23° C., ft-lb/in) | 25.0 (80 N) | 55.4 (N) | 54.8 (N) | 49.0 (N) |
| (−29° C., ft-lb/in) | 38.4 (80 N) | 37.9 (N) | 55.2 (N) | 53.5 (N) |
| (−40° C., ft-lb/in) | 21.5 (60 N) | 55.0 (N) | 56.4 (80 N) | 53.8 (N) |
| HDT |  |  |  |  |
| (66 psi, °C.) | 70 | 100 | 98 | 103 |
| (264 psi, °C.) | 64 | 83 | 82 | 83 |
| Hardness, Rockwell (R) | 105 | 120 | 120 | 121 |
| (L) | 62 | 90 | 96 | 95 |
| Mold Shrinkage % | 0.7 | 0.9 | 0.7 | 0.7 |
| Clarity | Clear | Clear | Clear | Clear |

As used herein, the inherent viscosity (I.V.) is measured at 25° C. using 0.50 g of polymer per 100 mL of a solvent consisting of 60% by weight phenol and 40% by weight tetrachloroethane.

The test used herein for determination of mechanical properties are describe as follows:

| Tensile Strength | ASTM D638-80 |
| --- | --- |
| Elongation | ASTM D638-80 |
| Flexural Modulus | ASTM D790-80 |
| Flexural Strength | ASTM D790-80 |
| Izod Impact | ASTM D256-80 |
| Heat Deflection Temperature, ° C. (HDT) | ASTM D648-72 |

Unless otherwise specified, all parts, percentages, ratios, etc., are by weight. Weight of reinforcing glass fibers and nucleating agent(s) are based on total composition weight.

Obviously, numerous modifications and variations of the present invention are possible in light of the above teachings. It is therefore to be understood that within the scope of the appended claims, the invention may be practiced otherwise than as specifically described herein.

We claim:

1. A clear polymer blend, the polymeric components consisting essentially of:
   (1) 25–90 wt. % of a glycol copolyester having repeat units from 1,4 cyclohexanedimethanol, terephthalic acid and an alkylene glycol;
   (2) 70–5 wt. % of a polycarbonate resin; and (3) 5–45 wt. % of an aromatic polyester having repeat units from isophthalic acid or terephthalic acid-/isophthalic acid mixtures and Bisphenol A.

2. The polymer blend of claim 1, wherein said polycarbonate resin and said aromatic polyester, in combination, comprise 10–40 wt. % of said polyester blend.

3. The polymer blend of claim 1, wherein said glycol polyester has an inherent viscosity of about 0.4–1.0 dl/grams.

4. The polymer blend of claim 1, wherein said polycarbonate resin has an inherent viscosity in the range of about 0.35–0.55 dl/gram.

5. The polymer blend of claim 1, wherein said aromatic polyester has an inherent viscosity in the range of about 0.4–1.0 dl/gram.

6. The polymer blend of claim 1, wherein said glycol polyester is derived from terephthalic acid, 1,4-cyclohexanedimethanol and $C_{2-6}$ alkylene glycol monomers.

7. The polymer blend of claim 6, wherein said alkylene glycol is ethylene.

8. The polymer blend of claim 1, wherein said polycarbonate resin is Bisphenol A polycarbonate.

9. The polymer blend of claim 1, wherein the acid component of said aromatic polymer is 40–60 mole % isophthalic acid and 60–40 mole % terephthalic acid.

10. The polymer blend of claim 1 wherein the acid component of the aromatic polyester is 100 mole % of isophthalic acid.

11. The polymer blend of claim 1 wherein the acid component of the aromatic polyester is 20–35 mole % isophthalic acid and 65–80 mole % terephthalic acid.

* * * * *